US006715677B1

(12) United States Patent
Nugent, Jr.

(10) Patent No.: US 6,715,677 B1
(45) Date of Patent: Apr. 6, 2004

(54) CHECKOUT SYSTEM INCLUDING A PRODUCT SECURITY LABEL DEACTIVATOR

(75) Inventor: Paul F. Nugent, Jr., Alpharetta, GA (US)

(73) Assignee: NCR Corporation, Dayton, OH (US)

( * ) Notice: Subject to any disclaimer, the term of this patent is extended or adjusted under 35 U.S.C. 154(b) by 0 days.

(21) Appl. No.: 10/054,314

(22) Filed: Nov. 13, 2001

(51) Int. Cl.[7] ................................................ G06K 15/00

(52) U.S. Cl. ....................... 235/383; 235/385; 235/451; 235/462.01; 235/492; 235/472; 235/462.05

(58) Field of Search ................................ 235/383, 385, 235/451, 462.01, 492, 472, 462.13, 462.05

(56) References Cited

U.S. PATENT DOCUMENTS

| | | | | | |
|---|---|---|---|---|---|
| 5,059,951 | A | * | 10/1991 | Kaltner | 235/375 |
| 5,412,191 | A | * | 5/1995 | Baitz et al. | 235/383 |
| 5,979,758 | A | * | 11/1999 | Swartz et al. | 235/375 |
| 6,158,662 | A | * | 12/2000 | Kahn et al. | 235/472.01 |
| 6,169,483 | B1 | * | 1/2001 | Ghaffari et al. | 340/568.1 |
| 6,333,692 | B1 | * | 12/2001 | Andersen et al. | 340/572.1 |
| 6,369,709 | B1 | * | 4/2002 | Larson et al. | 235/375 |

* cited by examiner

*Primary Examiner*—Karl D. Frech
*Assistant Examiner*—Steven S. Paik
(74) *Attorney, Agent, or Firm*—Paul W. Martin

(57) ABSTRACT

A checkout system which includes a product security label deactivator with a sensor for assisting operators with proper deactivation of security labels. The checkout system includes a computer, a barcode reader coupled to the computer for reading a barcode label on an item, and a security system coupled to the computer and activated by the barcode reader following reading of the barcode label including a field generator for deactivating a security label on the item, and a sensor for sensing placement of the item adjacent to the field generator. The security system initiates display of a message instructing the operator to place the item adjacent the field generator until the sensor senses the placement.

5 Claims, 5 Drawing Sheets

CHECKOUT SYSTEM INCLUDING A PRODUCT SECURITY LABEL DEACTIVATOR

BACKGROUND OF THE INVENTION

The present invention relates generally to a checkout system, and more particularly to a checkout system including a product security label deactivator.

A self-service checkout system is operated by a customer with little or no aid from a checkout clerk. Hence, during operation of a self-service checkout system, customers scan individual items for purchase across a scanner.

Some checkout systems are convertible between assisted and unassisted modes of operation. An example of a convertible checkout system can be found in U.S. Pat. No. 6,213,395, which is hereby incorporated by reference.

Security labels limit product theft. Security labels are affixed to products and must be deactivated at the time of purchase in order to prevent an alarm from being sounded as the customer exits. During the payment process, a checkout clerk at an assisted-service checkout counter deactivates the security labels by placing them near a product deactivator in the checkout counter.

Failure to deactivate a label could lead to customer embarrassment and accusations of theft. Therefore, it would be desirable to provide a checkout system which includes safeguards to reduce incidents involving failure to properly deactivate a security label on a purchased item.

SUMMARY OF THE INVENTION

In accordance with one embodiment of the present invention, a checkout system including a product security label deactivator is provided.

The checkout system includes a computer, a barcode reader coupled to the computer for reading a barcode label on an item, and a security system coupled to the computer and activated by the barcode reader following reading of the barcode label including a field generator for deactivating a security label on the item, and a sensor for sensing placement of the item adjacent to the field generator. The security system initiates display of a message instructing the operator to place the item adjacent the field generator until the sensor senses the placement.

It is accordingly an object of the present invention to provide a checkout system including a product security label deactivator.

It is another object of the present invention to provide a checkout system including a product security label deactivator with a sensor for assisting operators with proper deactivation of security labels.

It is another object of the present invention to provide a checkout system including a product security label deactivator with a sensor for assisting self-service customers with proper deactivation of security labels.

It is another object of the present invention to provide a convertible checkout system including a product security label deactivator with a pop-up housing containing a sensor for assisting only self-service customers with proper deactivation of security labels.

BRIEF DESCRIPTION OF THE DRAWINGS

Additional benefits and advantages of the present invention will become apparent to those skilled in the art to which this invention relates from the subsequent description of the preferred embodiments and the appended claims, taken in conjunction with the accompanying drawings, in which:

DETAILED DESCRIPTION OR THE INVENTION

Figure 1:
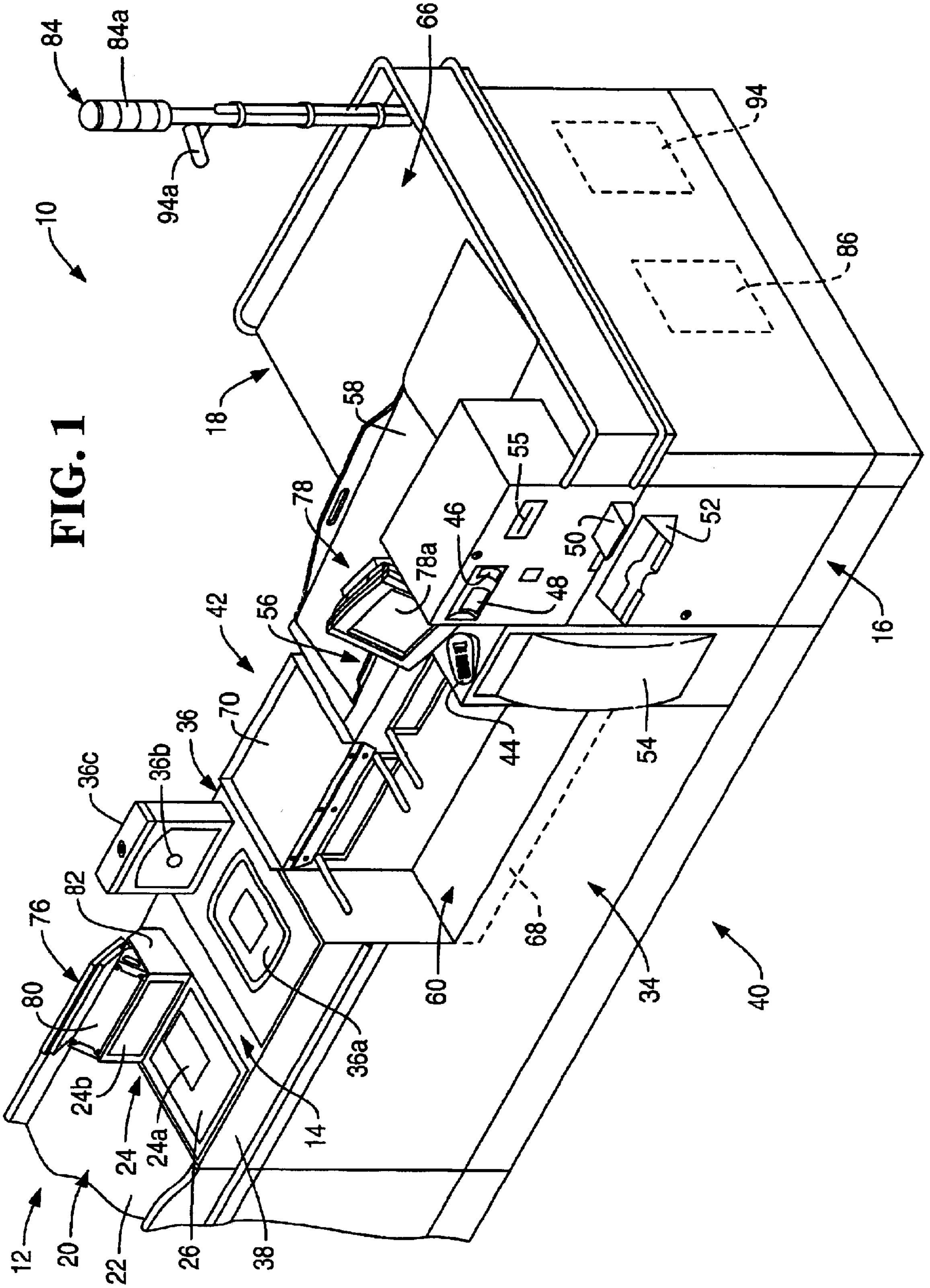
FIG. 1 is a perspective view of a retail checkout system configured in a self-service mode.
Figure 2:
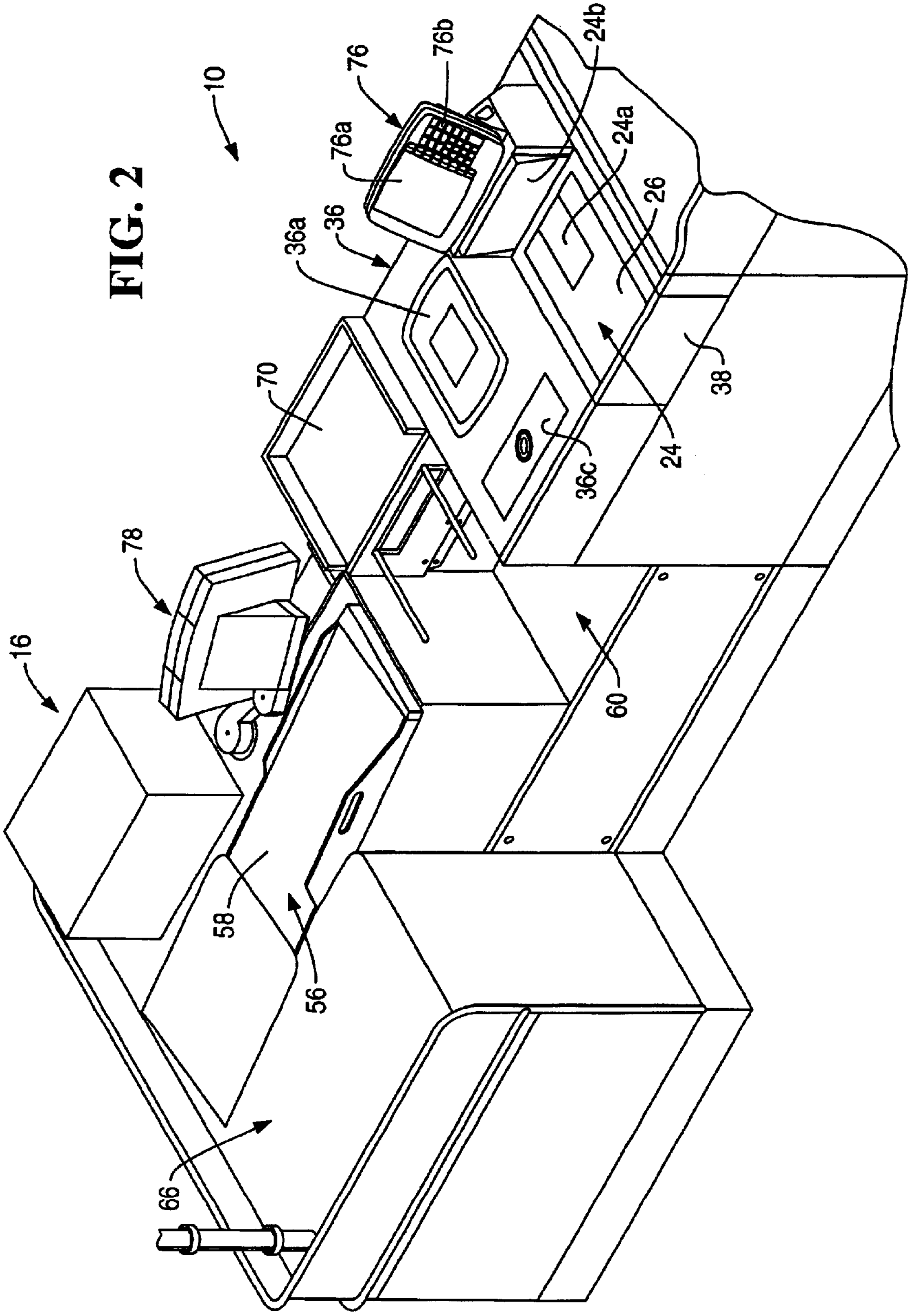
FIG. 2 is a view similar to FIG. 1, but showing the checkout system configured in an assisted-service configuration.

Referring now to FIGS. 1 and 2, there is shown a retail checkout system 10 for use in a retail business such as a grocery store. The checkout system 10 is configured to perform a number of retail functions such as assisted checkout functions and unassisted or "self-service" checkout functions.

Checkout system 10 includes a pre-scan area 12, an itemization area 14, a payment area 16, and a post-scan area 18. The pre-scan area 12 includes an item transport mechanism such as an input belt mechanism 20 which includes an input belt 22. Input belt mechanism 20 is utilized to convey items for purchase toward the itemization area 14 in order for the items to be scanned by a user of the checkout system 10.

Itemization area 14 includes scanner 24 and a product scale 26. Scanner 24 conventionally scans or reads a product identification code such as a Universal Product Code (UPC), industrial symbol(s), alphanumeric character(s), or other indicia associated with an item to be purchased. One scanner which may be used in the present invention is a model number 7875 bi-optic scanner which is commercially available from NCR Corporation of Dayton, Ohio.

Scanner 24 includes a first scanning window 24*a* and a second scanning window 24*b*. First scanning window 24*a* is disposed in a substantially horizontal manner, whereas second scanning window 24*b* is disposed in a substantially vertical manner.

Scanner 24 and product scale 26 are movably mounted to terminal base 34. In particular, scanner 24 and product scale 26 are rotatably mounted to a support platform such as a sliding drawer assembly 38. Use of the sliding drawer assembly 38 allows the scanner 24 and the product scale 26 to be rotated relative to the terminal base 34 so as to be operated by either a customer or a checkout clerk.

Checkout system 10 has a customer side 40 and an employee side 42. More specifically, terminal base 34 divides the checkout system 10 into the customer side 40 which is the side of the checkout system 10 where the customer is positioned during a checkout transaction, and the employee side 42 which is the side of the checkout system 10 where retail personnel such as a checkout clerk is located during a checkout transaction. A customer is positioned on the customer side 40 of the checkout system 10 irrespective of whether the system 10 is being operated to perform an assisted checkout transaction or a self-service checkout transaction, whereas retail personnel is at all times positioned on the employee side 42 of the checkout system 10. Use of the rotating scanner 24 facilitates such "same side" operation of the checkout system 10.

Itemization area 14 also includes security deactivation device 36. Security deactivation device 36 is provided to deactivate or otherwise disable security labels associated with an article surveillance system. In particular, certain items sold by the retailer may have an electronic or magnetic label secured thereto. Such labels trigger an alarm if the item is taken from the retailer's store without the label being deactivated or otherwise disabled beforehand.

Security deactivation device 36 includes a field generator 36*a* and an item sensor 36*b*. Field generator 36*a* deactivates security labels and is activated by scanner 24. Field generator 36*a* may produce a magnetic or electromagnet field.

Sensor 36*b* senses the presence of an item adjacent field generator 36*a*, in a location sufficient for deactivating a security label on the item. Sensor 36*b* is preferably an ultrasonic sensor.

In the illustrated embodiment, sensor 36*b* is located in pop-up housing 36*c*. Alternatively, for other checkout counter configurations, sensor 36*c* may be mounted in a raised position in permanent fashion.

With reference to FIG. 1, housing 36*c* is in a raised position during a self-service transaction. A self-service customer scans an item using scanner 24. After scanner 24 read a barcode label on the item, it activates field generator 36*a*. The customer places the item on or in close proximity to field generator 36*a* in order to deactivate a security label on the item.

Sensor 36*b* fails to produce a signal if the customer fails to place the item within the deactivation range of field generator 36*a*. In such an instance, interface terminal 78 prompts the customer to swipe the item over field generator 36*a* until sensor 36*b* produces a signal.

With reference to FIG. 2, pop-up housing 36*c* is shown in a recessed position during an assisted-service transaction. However, as indicated above, sensor 36*c* is suitable for operation in other checkout counter configurations during assisted-service operation, particularly those configurations in which operation is limited to one side.

Payment area 16 includes the system components necessary to allow a customer to perform retail finalization functions such as tendering payment for items for purchase and printing of transaction receipts. In particular, payment area 16 an electronic payment terminal 44 having a card reader and keypad, a pair of currency acceptors such as a coin acceptor 46 and a bill acceptor 50, a corresponding pair of currency dispensers such as a coin dispenser 48 and a bill dispenser 52, a receipt printer 54, and a coupon acceptor 55. As shown in FIG. 1, the system components associated with the payment area 16 are positioned to face the customer side 40 of the checkout system 10 so as to be accessible to a customer during a checkout transaction.

Post-scan area 18 includes an item transport mechanism such as a takeaway belt mechanism 56 having a takeaway belt 58. Moreover, the post-scan area 18 includes a self-service bag well 60 (FIG. 1) and an assisted bag well 62 (FIG. 2). Bag wells 60, 62 are provided to accommodate one or more grocery containers such as grocery bags.

Takeaway belt mechanism 56 is provided to transport items which have been scanned with the scanner 24 or otherwise entered into the checkout system 10 to a bagging counter 66 where the items are placed into grocery bags or the like by a bagging clerk. Hence, as described herein, self-service bag well 60, assisted bag well 62, and bagging counter 66 define the three bagging stations associated with checkout system 10.

Post-scan area 18 also includes a security scale 68. Security scale 68 is a weight scale which monitors the weight of items placed in either self-service bag well 60 or assisted bag well 62.

Post-scan area 18 further includes a set-aside shelf 70. Set-aside shelf 70 is positionable in either an assisted shelf position or a self-service shelf position. Set-aside shelf 70 is provided to allow a user of the system 10 to set an item aside once the item has been scanned or otherwise entered into system 10, but prior to placing the item into a grocery bag within one of bag wells 60, 62.

Checkout system 10 also includes a pair of user interface terminals for receiving input from and providing information to a user. In particular, checkout system 10 includes personnel interface terminal 76 (FIG. 2) and an interactive customer interface terminal 78 (FIG. 1).

Personnel interface terminal 76 includes a display monitor 76*a* and a keypad 76*b* (FIG. 2). Transaction information is displayed to a checkout clerk via display monitor 76*a* during operation of checkout system 10 by the clerk. The clerk may manually enter retail information such as item codes and quantities into checkout system 10 by use of keypad 76*b* associated with the personnel interface terminal 76. One integrated terminal which is particularly useful as the personnel interface terminal 76 of the present invention is a Dynakey terminal which is commercially available from NCR Corporation. Personnel interface terminal 76 is provided for use by a checkout clerk when checkout system 10 is being operated in its assisted mode of operation. Accordingly, personnel interface terminal 76 is generally not utilized by the customer when the checkout system 10 is being operated in its self-service mode of operation.

Interactive customer interface terminal 78 includes a display monitor 78*a* which is provided to display retail information to the customer during operation of checkout system 10 in either its assisted mode of operation or its self-service mode of operation. Moreover, instructions are displayed on display monitor 78*a* which assist or otherwise guide the customer through operation of the checkout system 10. Such instructions are particularly useful when checkout system 10 is being operated in its self-service mode of operation.

Display monitor 78*a* is preferably a known touch screen monitor which can generate data signals when certain areas of the screen are touched by a customer. Hence, display monitor 78*a* may be utilized by the customer to input information into the checkout system 10. For example, the customer may manually enter retail information such as item codes and quantities into the checkout system 10 by use of the touch screen associated with display monitor 78*a*. The customer may indicate a preferred method of payment (e.g. cash, credit, or debit card) by touching the appropriate area of the touch screen.

Interactive customer interface terminal 78 is preferably embodied as a stand-alone, kiosk-type device which is, in essence, a modified flat panel personal computer (PC) which includes a number of components commonly associated therewith. One such stand-alone, kiosk-type device which is particularly useful as an interactive customer interface terminal is a Model 7401 information terminal which is commercially available from NCR Corporation.

As shown in FIG. 1, checkout system 10 also includes a status light device 84 and a paging device 86. The status light device 84 and the paging device 86 are provided in order to notify store personnel, such as a customer service manager, if intervention into the current checkout transaction is needed.

Checkout system 10 also has a video system 94. Video system 94 includes a video camera such as a digital video camera 94*a* (FIG. 1). Video system 94 is included to provide security during operation of the checkout system 10.

Figure 3:
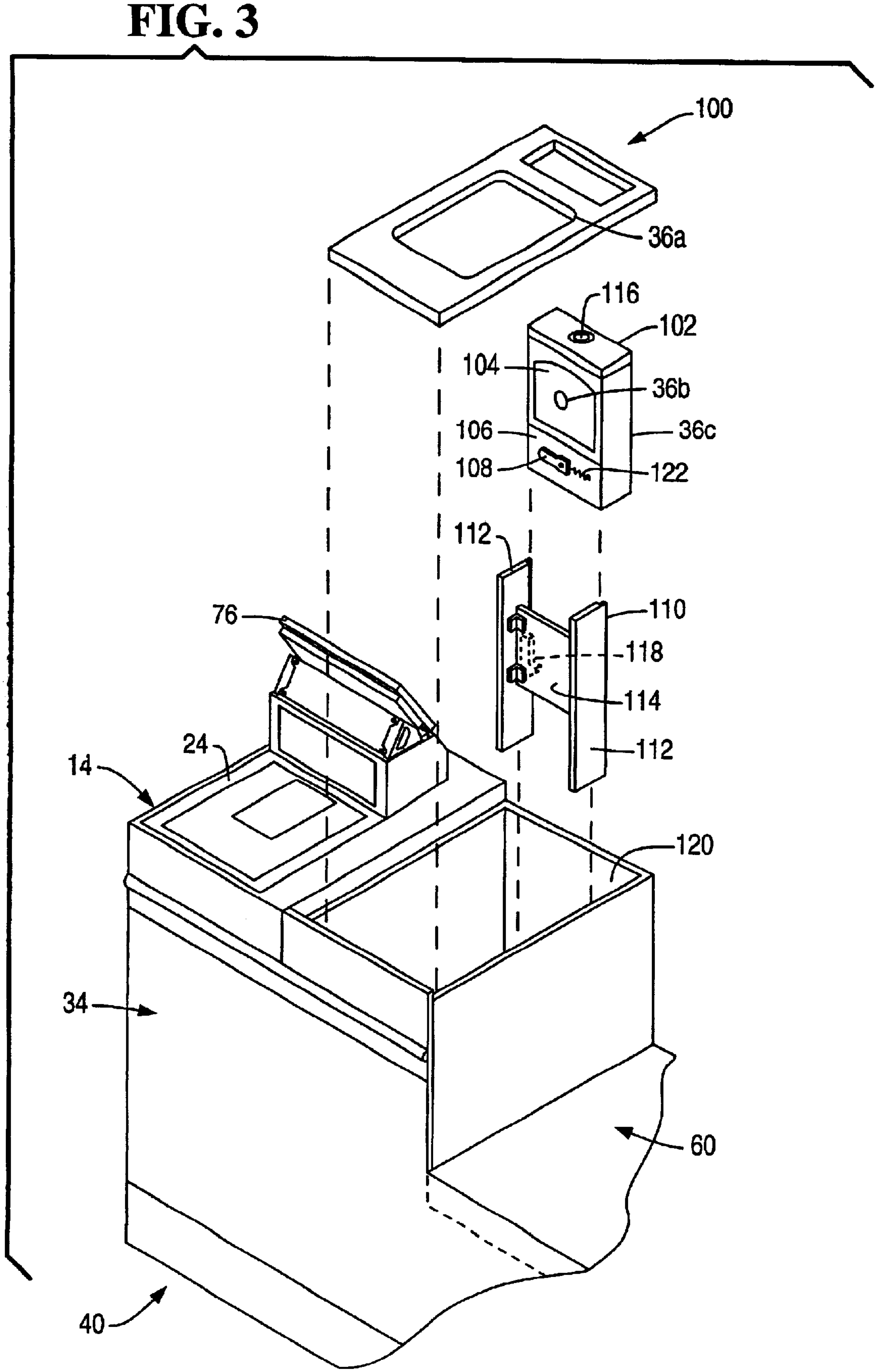
FIG. 3 is an exploded view of security label deactivator, including a pop-up housing.

Turning now to FIG. 3, security deactivation device 36 is shown in more detail.

Device 36 includes frame assembly 100, which surrounds field generator 36*a* and pop-up housing 36*b*. Frame assembly 100 provides a finished look to device 30 and fits over cavity 120.

Pop-up housing 36*b* includes lid 102, which contains latch 116. Latch 116 allows housing 36*b* to be raised and lowered.

Pop-up housing 36*b* also includes front panels 104 and 106. Panel 104 is visible when pop-up housing 36*b* is in the raised position and includes sensor 36*c*.

Panel 106 remains recessed at all times and includes lock 108. Lock 108 engages flange 118 to retain pop-up housing 36*b* in the raised position. Lock 108 is biased by spring 122 anchored to panel 106.

Flange 118 is generally L-shaped and is mounted to retaining assembly 110, which defines a channel for pop-up housing 36*b* within cavity 120. Retaining assembly includes side walls 112 and center wall 114 fastened between side walls 112. Flange 118 is mounted to center wall 114 on a side facing lock 108.

Figure 4A:
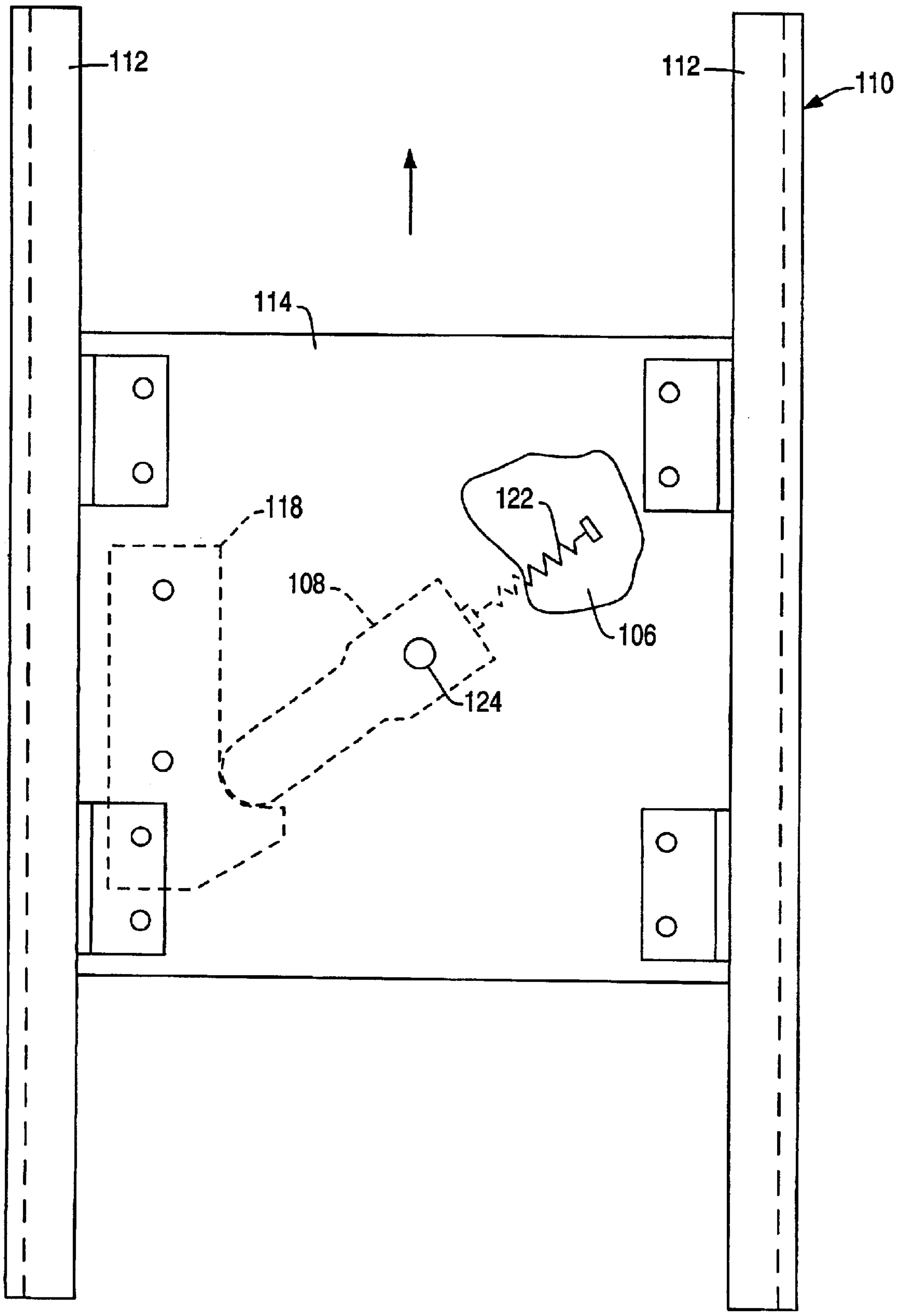
FIGS. 4A and 4B illustrate the operation of a latch within the pop-up housing.
Figure 4B:
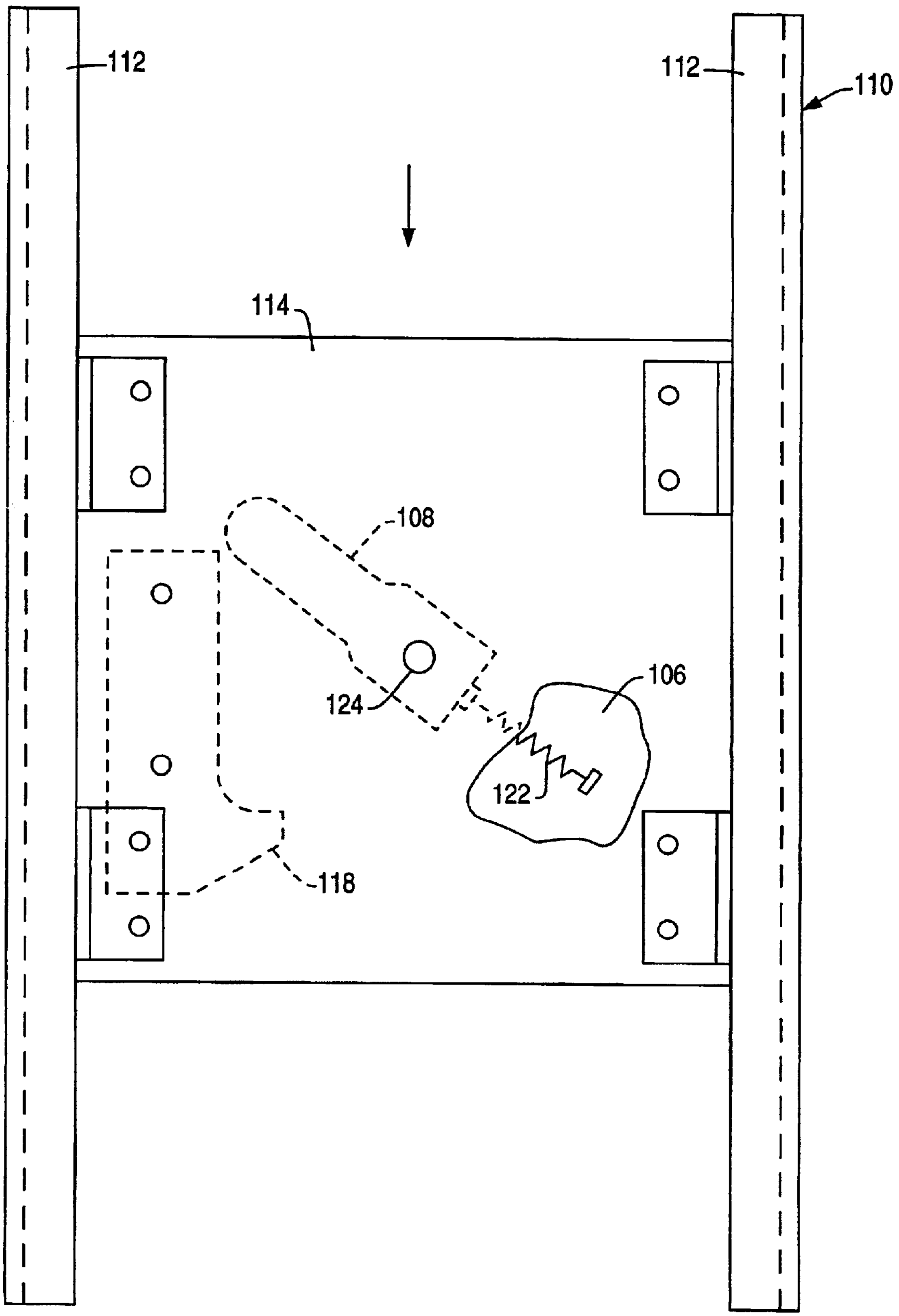

Turning now to FIGS. 4A and 4B, operation of lock 108 and flange 118 is illustrated in more detail.

With reference to FIG. 4A, lock 108 is shown in a position resting on flange 118. Lock 108 is in this position when pop-up housing 36*b* is in a raised position during the self-service mode of operation. Shaft 124 mounts lock 108 to panel 106 and is coupled to latch 116, with reference to FIG. 4B, lock 108 is shown in a released position following actuation of latch 116. After lock 108 rotates above flange 118, pop-up housing 36*b* may be lowered into cavity 120.

To raise pop-up housing 36*b*, an operator engages latch 116, pop-up housing 36*b*, and releases latch 36*b* to the position in FIG. 4A.

Although the present invention has been described with particular reference to certain preferred embodiments thereof, variations and modifications of the present invention can be effected within the spirit and scope of the following claims.

What is claimed is:

1. A checkout system convertible between assisted-service and self-service checkout operation comprising:

a computer for completing sale of an item;

a barcode reader mounted in a checkout counter and coupled to the computer for reading a barcode label on the item as it is passed over the barcode reader; and a security system mounted separately from and adjacent to the barcode reader in the checkout counter and coupled to the computer and activated by the barcode reader following reading of the barcode label including a field generator for deactivating a security label on the item; and a pop-up housing on an assisted-service side of the checkout counter adjacent the field generator and vertically moveable between a raised position for self-service checkout operation and a recessed position for assisted-service checkout operation;

wherein the pop-up housing contains a sensor facing a customer side of the checkout counter for sensing placement of the item within a deactivation-range of the field generator during self-service checkout operation; and wherein the security system initiates display of a message following the reading of the barcode label instructing a self-service customer to place the item over the field generator and within the deactivation range of the field generator until the sensor senses the placement during self-service checkout operation.

2. A product security system comprising:

a field generator mounted in a checkout counter for deactivating a security label on an item for sale; and a pop-up housing mounted in the checkout counter opposite a customer side of the field generator and adjacent an assisted-service side of the field generator and moveable between a raised position for self-service checkout operation and a recessed position for assisted-service checkout operation;

wherein the pop-up housing contains a sensor facing the customer side for sensing placement of the item within a deactivation range of the field generator following reading of barcode label during self-service checkout operation; and wherein the security system initiates display of a message following reading of a barcode label on the item instructing a self-service customer to place the item over the field generator and within the deactivation range of the field generator until the sensor senses the placement during self-service checkout operation.

3. A transaction method comprising the steps of:

reading a barcode label on an item for sale by a barcode reader mounted in a checkout counter during movement of the item over the barcode reader;

obtaining barcode information from the barcode reader by a computer;

activating a field generator mounted separately from and adjacent to the barcode reader in the checkout counter for deactivating a security label on the item by the computer;

determining whether the item comes within a deactivation range of the field generator by the computer; and if the item does not come within the deactivation range, initiating display of a message instructing an operator to place the item over the field generator and within the deactivation range of the field generator.

4. A transaction method comprising the steps of:

positioning a pop-up sensor associated with a field generator, which is mounted separately from and adjacent to a barcode reader in a checkout counter, in a raised position facing a customer side of the checkout counter to identify an item for sale within a deactivation range of the field generator during a self-service checkout transaction;

reading a barcode label on the item by the barcode reader as the item passes over the barcode reader;

obtaining barcode information from the barcode reader by a computer;

activating the field generator to deactivate a security label on the item by the computer;

determining from the sensor whether the item comes within the deactivation range of the field generator by the computer; and if the item does not come within the deactivation range, initiating display of a message instructing an operator to place the item over the field generator and within the deactivation range of the field generator.

5. A checkout system convertible between assisted-service and self-service checkout operation comprising:

a checkout counter having a customer side and an assisted-service side;

a computer with the checkout counter for completing sale of an item;

a barcode reader mounted in the checkout counter and coupled to the computer for reading a barcode label on the item as it is passed over the barcode reader; and a security system mounted separately from and adjacent to the barcode reader and coupled to the computer and activated by the barcode reader following reading of the barcode label including a field generator for deactivating a security label on the item; and a pop-up housing on the assisted-service side of the checkout counter adjacent the field generator and vertically moveable between a raised position for self-service checkout operation and a recessed position for assisted-service checkout operation;

wherein the pop-up housing contains a sensor facing the customer side of the checkout counter for sensing placement of the item within a deactivation range of the field generator during self-service checkout operation; and wherein the security system initiates display of a message following the reading of the barcode label instructing a self-service customer to place the item over the field generator and within the deactivation range of the field generator until the sensor senses the placement during self-service checkout operation.

* * * * *